United States Patent [19]
Tiemeyer

[11] Patent Number: 5,696,360
[45] Date of Patent: Dec. 9, 1997

[54] SOUND-ABSORBING MOTOR MOUNT FOR ELECTRIC ACTUATING DRIVES IN MOTOR VEHICLES

[75] Inventor: Peter Tiemeyer, Wuerzburg, Germany

[73] Assignee: Siemens Aktiengesellschaft, Münich, Germany

[21] Appl. No.: 504,938

[22] Filed: Jul. 20, 1995

[30] Foreign Application Priority Data

Aug. 8, 1994 [EP] European Pat. Off. ............ 94112365.5

[51] Int. Cl.$^6$ .................................................. G10K 11/00
[52] U.S. Cl. .................. 181/205; 181/202; 181/207; 181/208
[58] Field of Search ................................ 181/198, 200, 181/202, 205, 207, 208; 310/51, 89

[56] References Cited

U.S. PATENT DOCUMENTS

| | | | |
|---|---|---|---|
| 2,451,970 | 10/1948 | Odor | 181/202 |
| 2,838,262 | 6/1958 | Anderson | 181/202 |
| 3,527,969 | 9/1970 | Papst | 310/51 |
| 3,980,912 | 9/1976 | Panza | 310/51 |
| 4,258,821 | 3/1981 | Wendt et al. | 181/202 |

FOREIGN PATENT DOCUMENTS

| | | |
|---|---|---|
| 0 550 706 | 7/1993 | European Pat. Off. . |
| 2 408 938 | 6/1979 | France . |
| 1 268 797 | 5/1968 | Germany . |
| 91 08 745 | 12/1992 | Germany . |
| 43 06 588 | 1/1994 | Germany . |

*Primary Examiner*—Khanh Dang
*Attorney, Agent, or Firm*—Kenyon & Kenyon

[57] ABSTRACT

A motor mount is described for preventing the transmission of noisy vibration of the motor on vehicle body parts on which the motor is mounted by its motor housing. The motor housing is held by a carrier part that surrounds it. The carrier part is surrounded at a radial distance by a mounting part at least in some areas. The mounting part is connected to the carrier part by an elastic sound-absorbing intermediate layer that is subjected substantially to tensile stresses.

8 Claims, 1 Drawing Sheet

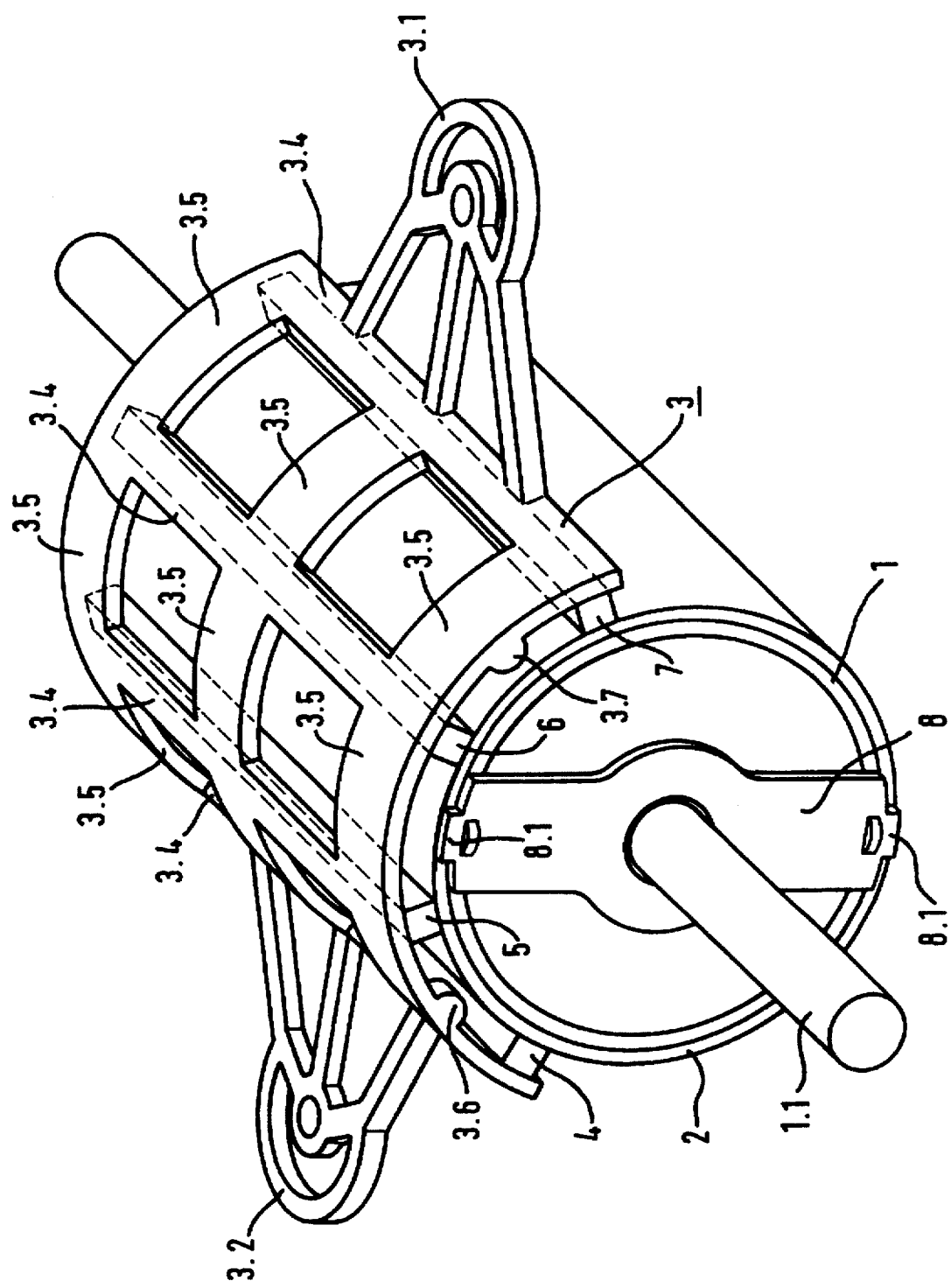

SOUND-ABSORBING MOTOR MOUNT FOR ELECTRIC ACTUATING DRIVES IN MOTOR VEHICLES

BACKGROUND OF THE INVENTION

The present invention pertains to a sound-absorbing mount, especially for electric actuating drives in motor vehicles.

High demands are made of the actuating drives in motor vehicles, especially with regard to quiet running. With a d.c. motor that operates with a permanent magnet, or the like, usually provided for such auxiliary drives, noise is generated especially by oscillation or vibration of the motor and individual parts of the motor due to fluctuations in torque caused by the commutation and fluctuations in conductance due to the slotting of the rotor and also due to excitation of the brush systems due to the commutator slotting. If the noise abatement is inadequate, there is the danger that such vibrations might be amplified by the coupling of the motor to the body parts on which it is mounted and then be emitted as airborne noise.

In German Patent No. 1,268,797, a device for absorbing vibration noise in a motor fan unit is arranged in a surrounding cylindrical housing, such as a fan in a vacuum cleaner. A tubular ring made of an elastic material supported between the surrounding housing and the motor fan unit is arranged so that it is in contact with the cylindrical surface and has several projections extending radially toward the opposite cylindrical surface and it is pressed between the outer circumference of the motor and the surrounding cylindrical housing under radial tension. Such sound-absorbing motor mounts are not suitable for achieving the desired isolation mentioned above and are also unsuitable for automated manufacturing procedures because of the difficulty in assembling them.

There is a need for solving the problem of designing a sound-absorbing motor mount that can assure a flexible decoupling effect and thus attenuation even of low resonant frequencies while still being simple to manufacture and assemble.

SUMMARY OF THE INVENTION

This and other needs are satisfied by the sound-absorbing motor mount of the present invention. The mount includes a carrier part which holds a motor housing of a motor. The carrier part surrounds the motor housing. A mounting part is provided which overlaps the carrier part at a radial distance over at least a partial area of the carrier part. Elastic sound-absorbing intermediate layers, that are subjected substantially to tensile stresses, are coupled between the mounting part and the carrier part.

Because the sound-absorbing intermediate layer is subjected substantially to tensile stresses, there is no need for isolation elements that have been prestressed under compression (which would thus require a certain minimum strength). The motor can easily be mounted in the carrier part and the carrier part on the mount part in a simple push-fit axial assembly.

In a first embodiment of the present invention, the manufacturing and assembly costs can be further minimized by designing the carrier part as a sleeve in the sense of an axial push-fit receptacle for the motor. Especially when installed in a horizontal position, the carrier part is overlapped by a saucer-shaped mounting part at a radial distance substantially in its upper part, where preferably the carrier part and/or the mounting part are designed as plastic parts (e.g., injection-molded plastic parts). The sound-absorbing intermediate layer can be made of a thermoplastic elastomer molded on the carrier part and/or the mounting part. With a vertical installed position, preferably a sleeve-shaped mounting part and a sound-absorbing intermediate layer are provided over the entire circumference. Locking devices, especially rabbet joints, can also be provided in an advantageous embodiment as the exclusive or additional mounting connection between the carrier part or the mounting part and the sound-absorbing intermediate layer.

BRIEF DESCRIPTION OF THE DRAWING FIGURE

The sole drawing FIGURE is a schematic diagram of a perspective view a sound-absorbing motor mount constructed and installed according to a first embodiment of the present invention.

DETAILED DESCRIPTION

The FIGURE shows an electric motor that is inserted into a sleeve-shaped carrier part 2 in an axial assembly technique suitable for automation. The electric motor includes a motor housing 1 and a rotor axle 1.1 that projects out of the electric motor at one of the ends of the motor. A fan wheel or a motor vehicle fan, for example, may be mounted on the rotor axle 1.1. After inserting the motor housing 1 into sleeve-shaped carrier part 2, the axial position is fixed relative to carrier part 2 in the remaining motor assembly because bearing straps 8 with radially projecting lugs 8.1 are attached to the end of motor housing 1 and are positioned axially in front of the end of the carrier part 2.

To mount such a fan in a motor vehicle body part or a motor vehicle fan housing, carrier part 2 is overlapped at a radial distance in its upper half by a preferably grid-shaped mounting part 3 that is adapted to the curvature of the carrier part 2. Mounting part 3 is connected to the carrier part 2 by sound-absorbing webs 4–7 that run essentially like webs in the axial direction at a mutual tangential distance and are manufactured as injection-molded plastic parts that are molded onto at least one of the above-mentioned parts. It is especially expedient to manufacture the sound-absorbing webs as part of the carrier part 2.

To assure good ventilation of the electric motor and to lower costs and reduce overall weight, the mounting part 3 is designed as ribs in a first embodiment of the present invention, with longitudinal ribs 3.4 running axially, so they are in contact with sound-absorbing webs 4–7, and with transverse ribs 3.5 that run tangentially. The mounting part 3 also has lateral mounting receptacles 3.1, 3.2 which are preferably produced by injection molding in one piece with the mounting part and on which the entire fan unit can be mounted in a fan housing or in a body part (e.g., by means of bolts).

Stop borders 3.6, 3.7 are provided either on the carrier part 2 or on mounting part 3 (as shown in FIG. 1), preferably in one piece, especially at the axial end areas of the mounting part 3. The stop borders 3.6, 3.7 protect against excessive deflection of the carrier part 2 relative to overlapping mounting part 3. This prevents the fan impeller that is mounted on rotor axle 1.1 from striking or grinding (e.g., in a surrounding fan housing).

What is claimed is:

1. A sound-absorbing motor mount, comprising:
   a carrier part which is configured to surround and securely contain a motor housing of a motor;

a mounting part which overlaps said carrier part at a radial distance over at least a partial area of said carrier part; and elastic sound-absorbing intermediate layers, that are configured to withstand tensile stresses, located between the mounting part and the carrier part and connecting the mounting part to the carrier part, wherein at least one of the carrier part and the mounting part includes radial stop borders molded as one-piece with said part, said radial stop borders preventing deflection of said carrier part relative to said mounting part.

2. A sound-absorbing motor mount, comprising:

a carrier part in the shape of a sleeve which is configured to axially extend along, surround and securely contain a motor housing of a motor;

a mounting part which overlaps said carrier part at a radial distance over at least a partial area of said carrier part; and elastic sound-absorbing intermediate layers, that are configured to withstand tensile stresses, located between the mounting part and the carrier part and connecting the mounting part to the carrier part;

wherein at least one of the carrier part and the mounting part includes radial stop borders molded as one-piece with said part, said radial stop borders preventing deflection of said carrier part relative to said mounting part.

3. A sound-absorbing motor mount, comprising:

a carrier part which is configured to surround and securely contain a motor housing of a motor;

a mounting part which overlaps an upper part of said carrier part at a radial distance over at least a partial area of said carrier part; and elastic sound-absorbing intermediate layers, that are configured to withstand tensile stresses, located between the mounting part and the carrier part and connecting the mounting part to the carrier part, wherein at least one of the carrier part and the mounting part includes radial stop borders molded as one-piece with said part, said radial stop borders preventing deflection of said carrier part relative to said mounting part.

4. A sound-absorbing motor mount, comprising:

a carrier part in the shape of a sleeve which is configured to axially extend along, surround and securely contain a motor housing of a motor;

a mounting part which overlaps an upper portion of said carrier part at a radial distance over at least a partial area of said carrier part, at least one of the carrier part and the mounting part being made of plastic, wherein at least one of the carrier part and the mounting part includes radial stop borders molded as one-piece with said part, said radial stop borders preventing deflection of said carrier part relative to said mounting part; and an elastic sound-absorbing intermediate layer made of a thermoplastic elastomer that is configured to withstand tensile stresses, located between the mounting part and the carrier part and connecting the mounting part to the carrier part, wherein said sound-absorbing intermediate layer comprises sound-absorbing webs having a mutual tangential spacing and running axially along the carrier part, and wherein the intermediate layer is injection molded on at least one of the carrier part and the mounting part.

5. A sound-absorbing motor mount, comprising:

a carrier part which is configured to surround and securely contain a motor housing of a motor;

a mounting part which overlaps said carrier part at a radial distance over at least a partial area of said carrier part, said mounting part including mounting receptacles molded in one piece with said mounting part, said mounting receptacles being capable of being attached to an external mount; and elastic sound-absorbing intermediate layers, that are configured to withstand tensile stresses, located between the mounting part and the carrier part and connecting the mounting part to the carrier part.

6. The motor mount of claim 4 wherein said mounting part includes mounting receptacles molded in one piece with said mounting part, said mounting receptacles are capable of being attached to an external mount.

7. A sound-absorbing motor mount, comprising:

a carrier part which is configured to surround and securely contain a motor housing of a motor;

a mounting part which overlaps said carrier part at a radial distance over at least a partial area of said carrier part; and elastic sound-absorbing intermediate layers, that are configured to withstand tensile stresses, located between the mounting part and the carrier part and connecting the mounting part to the carrier part, wherein said mounting part has a grid structure.

8. A sound-absorbing motor mount, comprising:

a carrier part in the shape of a sleeve which is configured to axially extend along, surround and securely contain a motor housing of a motor;

a mounting part having a grid structure, which overlaps an upper portion of said carrier part at a radial distance over at least a partial area of said carrier part, at least one of the carrier part and the mounting part being made of plastic; and an elastic sound-absorbing intermediate layer made of a thermoplastic elastomer that is configured to withstand tensile stresses, located between the mounting part and the carrier part and connecting the mounting part to the carrier part, wherein said sound-absorbing intermediate layer is injection molded on at least one of the carrier part and the mounting part.

* * * * *